United States Patent
Jendbro et al.

(10) Patent No.: US 7,561,890 B2
(45) Date of Patent: Jul. 14, 2009

(54) HOTSPOT LOCATION DATABASE SYSTEM, MOBILE TERMINAL FOR USE IN SUCH A SYSTEM AND METHOD FOR CREATING MAINTAINING AND UPDATING SUCH A SYSTEM

(75) Inventors: Magnus Jendbro, Staffanstorp (SE); Tomas Karl-Axel Wässingbo, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 477 days.

(21) Appl. No.: 11/425,714

(22) Filed: Jun. 22, 2006

(65) Prior Publication Data

US 2007/0297355 A1    Dec. 27, 2007

(51) Int. Cl.
*H04W 24/00* (2009.01)
(52) U.S. Cl. .............. 455/456.6; 455/456.1; 455/456.2
(58) Field of Classification Search ............. 455/151.2, 455/456.6
See application file for complete search history.

(56) References Cited

U.S. PATENT DOCUMENTS

| | | | |
|---|---|---|---|
| 7,046,989 B2 * | 5/2006 | Karaoguz et al. ........... 455/408 |
| 7,321,787 B2 * | 1/2008 | Kim ........................... 455/574 |
| 7,380,000 B2 * | 5/2008 | Yaqub et al. ................. 709/224 |
| 2002/0151325 A1 * | 10/2002 | Fitton et al. ................. 455/553 |
| 2003/0118015 A1 * | 6/2003 | Gunnarsson et al. ........ 370/389 |
| 2004/0162084 A1 | 8/2004 | Wang |
| 2004/0223470 A1 | 11/2004 | Smith |
| 2005/0272386 A1 * | 12/2005 | Kawakami et al. ......... 455/151.2 |
| 2007/0041344 A1 * | 2/2007 | Yaqub et al. ................. 370/331 |

FOREIGN PATENT DOCUMENTS

| | | |
|---|---|---|
| EP | 1 507 362 A1 | 2/2005 |
| EP | 1 612 999 A | 1/2006 |
| WO | 2006014439 | 2/2006 |

* cited by examiner

*Primary Examiner*—Lester Kincaid
*Assistant Examiner*—Isaak R Jama
(74) *Attorney, Agent, or Firm*—Renner, Otto, Boiselle & Sklar, LLP

(57) ABSTRACT

The invention relates to a hotspot location database system and a method for creating, maintaining and updating such a system. A hotspot location database (6) is created locally in a mobile terminal (1). The mobile terminal is adapted to monitor locations of available hotspots and store information in its local database (6). The mobile terminal is also adapted to monitor the presence of other mobile terminals (9) using a local connectivity network, in order to share information with the other mobile terminals by exchanging information for update of their local databases. The invention also relates to such a mobile terminal for use in the system.

27 Claims, 1 Drawing Sheet

HOTSPOT LOCATION DATABASE SYSTEM, MOBILE TERMINAL FOR USE IN SUCH A SYSTEM AND METHOD FOR CREATING MAINTAINING AND UPDATING SUCH A SYSTEM

FIELD OF THE INVENTION

The present invention relates to a hotspot location database system and a method for creating, maintaining and updating such a system. Mobile terminals collect information about hotspots and store information about the location of the hotspot. Then the mobile terminals may share the information with other mobile terminals to update their respective databases.

The invention also relates to such a mobile terminal for use in the system.

BACKGROUND OF THE INVENTION

Many mobile terminals are provided with wireless local area network, WLAN, access interface to be able to access e.g. the Internet. A WLAN comprises access points with associated coverage areas, so called hotspots. Today, information about available hotspots can sometimes be found in databases accessible through the Internet.

WO 2006/014439 discloses a hotspot location record database and a method of dynamically maintaining searchable database of information relating to hotspots. Records for hotspot locations are accumulated from information received from providers, such as venues and locations, all specialized entities assigned to the task of obtaining and sending current hotspot information.

U.S. Pat. No. 7,046,989 relates to devices and networks that utilize a wireless network and methods of maintaining access to a portable device when the portable device passes from one access area to another access area for the wireless network. A process of maintaining access information between wireless hotspots is disclosed. Information related to an access session between a portable device and a first access point is passed to a shared register accessible by plurality of wireless hotspots. The information related to the access session may be used to facilitate access to one of the plurality of wireless hotspots by a portable device.

In the above documents, the hotspot databases and the shared registers are only accessible when a user with a mobile terminal is in contact with a wireless network or through a connection to Internet, usually also involving a charge. Thus, when a user is moving outside a hotspot there is no readily available means to know in what direction to move to enter inside a hotspot.

SUMMARY OF THE INVENTION

An object of the present invention is to provide a hotspot location database locally in a mobile terminal.

Another object is to provide a method of rapidly accumulating information for inclusion in a hotspot location database in a mobile terminal using cooperating mobile terminals.

A further object is to provide a method of letting mobile terminals share hotspot location databases using a local connectivity network, such as short range radio.

In the present invention a hotspot location database is created locally in a mobile terminal. The mobile terminal is adapted to monitor locations of available hotspots and store information in its local database. The mobile terminal is also adapted to monitor the presence of other mobile terminals using a local connectivity network, in order to share information with the other mobile terminals by exchanging information for update of their local databases.

In a first aspect, the invention provides a hotspot location database system comprising:
a number of mobile terminals, each mobile terminal comprising:
means for communication with a WLAN and detection of the received WLAN signal strength;
means for detection of its position;
means for storing information about WLAN access points at least including information about positions and coverage in a hotspot location database;
wherein said mobile terminal is adapted to:
monitor the received WLAN signal strength associated with an access point;
store location information about the coverage associated with said access point in said hotspot location database.

In one embodiment, said hotspot location database is incorporated in the mobile terminal.

Preferably, said mobile terminal further comprises means for communication with other mobile terminals using a local connectivity network;
said mobile terminal being adapted to:
monitor the presence of another mobile terminal within range for communication using local connectivity;
send a request for hotspot location database update to the other mobile terminal;
receive a hotspot location database update from the other mobile terminal and to update its own hotspot location database.

Said request may contain a parameter defining the radius of interest for hotspots from the current location.

Said radius of interest may be defined by a user of the mobile terminal.

Preferably, said mobile terminal is adapted to:
receive a request for hotspot location database update from another mobile terminal;
send a hotspot location database update to the other mobile terminal.

Said request may contain a parameter defining the radius of interest for hotspots from the current location, and the mobile terminal is adapted to only include information from its hotspot location database associated to hotspots within the radius of interest from the current location.

Suitably, the local connectivity network involves short range radio.

Said mobile terminal may be adapted to store said information in a hotspot location database in an external server.

Suitably, the server is accessed through a WLAN access point.

In a second aspect, the invention provides a mobile terminal for use in a hotspot location database system, said mobile terminal comprising:
means for communication with a WLAN and detection of the received WLAN signal strength;
means for detection of its position;
means for storing information about WLAN access points at least including information about positions and coverage in a hotspot location database;
wherein said mobile terminal is adapted to:
monitor the received WLAN signal strength associated with an access point;
store location information about the coverage associated with said access point in said hotspot location database.

In one embodiment, said hotspot location database is incorporated in the mobile terminal.

Preferably, said mobile terminal further comprises means for communication with other mobile terminals using a local connectivity network;

said mobile terminal being adapted to:

monitor the presence of another mobile terminal within range for communication using local connectivity;

send a request for hotspot location database update to the other mobile terminal;

receive a hotspot location database update from the other mobile terminal and to update its own hotspot location database.

Said request may contain a parameter defining the radius of interest for hotspots from the current location.

Said radius of interest may be defined by a user of the mobile terminal.

Preferably, said mobile terminal is adapted to:

receive a request for hotspot location database update from another mobile terminal;

send a hotspot location database update to the other mobile terminal.

Said request may contain a parameter defining the radius of interest for hotspots from the current location, and the mobile terminal is adapted to only include information from its hotspot location database associated to hotspots within the radius of interest from the current location.

Suitably, the local connectivity network involves short range radio.

Said mobile terminal may be adapted to store said information in a hotspot location database in an external server.

Suitably, the server is accessed through a WLAN access point.

In a third aspect, the invention provides a method for maintaining and updating a hotspot location database system comprising:

at least one mobile terminal monitoring received WLAN signal strength associated with an access point;

storing location information about the coverage associated with said access point in a hotspot location database.

In one embodiment, said information is stored in a hotspot location database incorporated in the mobile terminal.

Preferably, the method includes the further steps of:

in one mobile terminal monitoring the presence of another mobile terminal within range for communication using local connectivity;

said one mobile terminal sending a request for hotspot location database update to the other mobile terminal;

said one mobile terminal receiving a hotspot location database update from the other mobile terminal and updating the hotspot location database of the sending mobile terminal.

Said request may contain a parameter defining the radius of interest for hotspots from the current location.

Said radius of interest may be defined by a user of the sending mobile terminal.

Preferably, the method includes the further steps of:

in one mobile terminal receiving a request for hotspot location database update from another mobile terminal;

said one mobile terminal sending a hotspot location database update to the other mobile terminal.

Said request may contain a parameter defining the radius of interest for hotspots from the current location, and said one mobile terminal only including information from its hotspot location database associated to hotspots within the radius of interest from the current location.

Suitably, the local connectivity network involves short range radio.

Said information may be stored in a hotspot location database in an external server.

Suitably, the server is accessed through a WLAN access point.

Preferably, the location information comprises longitudes and latitudes of the coverage area of the current hotspot and a time stamp.

BRIEF DESCRIPTION OF THE DRAWINGS

The invention will be described below with reference to the appended drawings of which the only

DETAILED DESCRIPTION OF PREFERRED EMBODIMENTS

Figure 1:
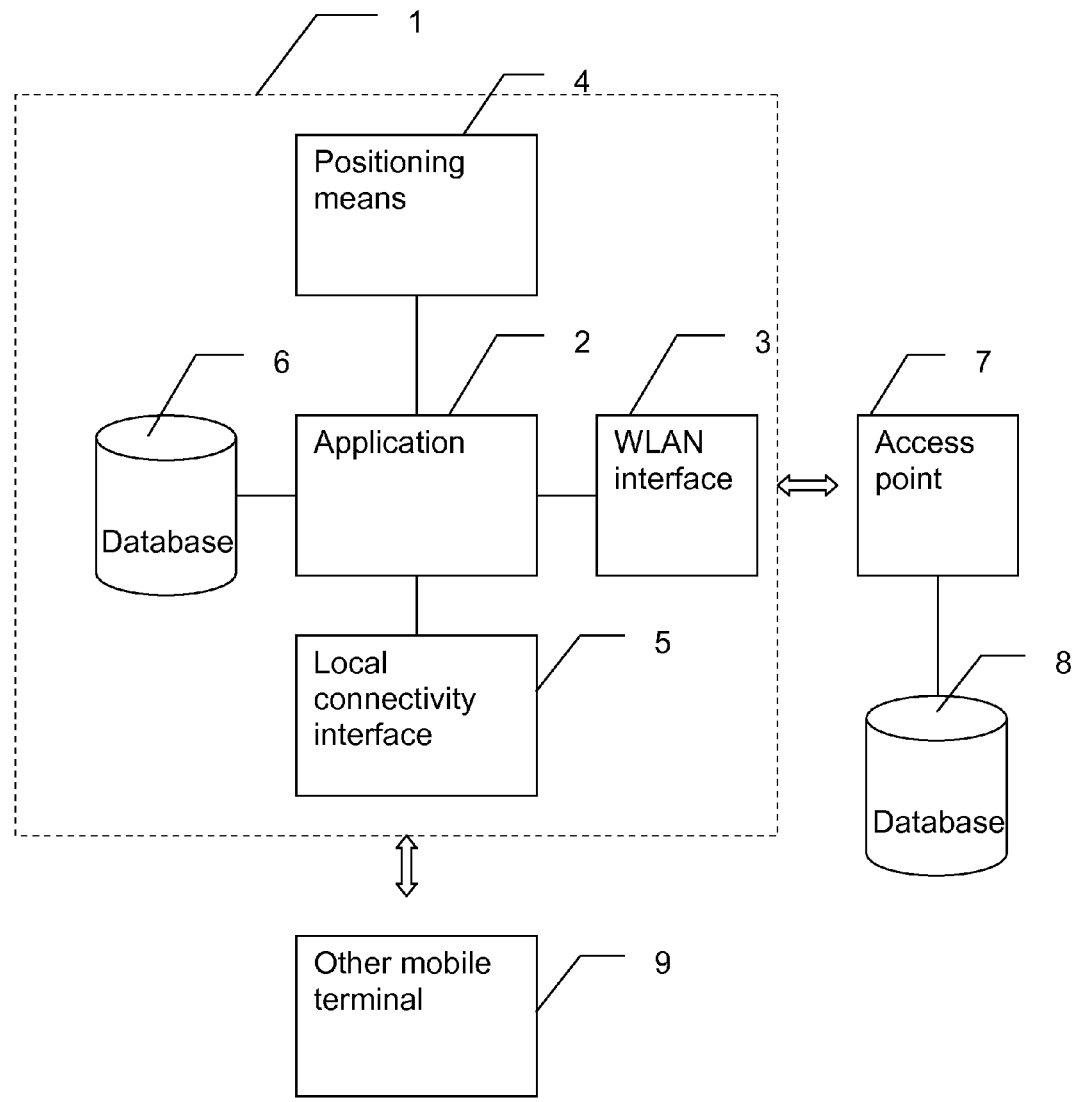
FIG. 1 is a schematic representation of a mobile terminal according to the present invention.

As is known, WLAN is a local network used by terminals such as computers, laptops and mobile telephones to gain access to e.g. the Internet. WLAN operates in a way similar to a mobile telecommunications network with base stations at so called access points providing coverage over short distances, in the range of less than 100 meters. The coverage area is called a hotspot. For mobile terminals WLAN provides an alternative communication channel usually without any call charges as opposed to a switched connection over the mobile telecommunications network.

Conventionally, a mobile terminals scans for hotspots using its WLAN interface. If detected the hotspot may be used. On the other hand, as discussed in the introduction, if a hotspot is not detected the user does not know where to move to enter within coverage of an available hotspot which may be in the vicinity. Since WLAN hotspots are usually operated by various—unconnected—entities, such as shop owners, telecommunication operators, universities and so forth, there is normally no central register indicating the location of all hotspots available to the user. This means that only by trial and error a user can find a hotspot in an area that is unfamiliar to him.

The present invention will be described with reference to a mobile telephone, herein referred to as a mobile terminal. In FIG. 1 components of a terminal 1 relevant to the present invention are shown. Other parts of the terminal may be conventional.

The invention is implemented in an application 2 that resides locally in the mobile terminal 1, suitably as a software module incorporated in the control unit of the mobile terminal. The application 2 cooperates with a WLAN radio interface 3 for communication with access points 7 of a WLAN. The application 2 is adapted to detect and store received signal strengths.

The application is also connected to a positioning means 4, such as a GPS receiver or other positioning means e.g. operating through cooperation with a mobile telecommunications network as is known in the art.

The application 2 scans continuously for available hotspots through the WLAN interface 3. If a hotspot is found the application 2 keeps monitoring it. The purpose is to store approximate longitudes and latitudes of the coverage area of the current hotspot. The received signal strength is detected and coupled with geographical information provided by the positioning means 4. For instance, signal strengths could be stored at regular intervals, with regard to time or space. Alternatively, when the signal strength passes below a predefined lower limit, the corresponding position is noted, thus defining the outer boundary of the hotspot.

The information is stored in a database 6 which resides in a memory (external or internal) of the mobile terminal 1. In this way, the approximate longitudes and latitudes for the hotspot is stored, suitably together with the name of the hotspot or provider and other relevant information, such as SSID, service set identifier. The geographical information may be stored as a set of points with longitudes and latitudes and/or as an irregularly shaped coverage area defined by its boundaries, e.g. a polygon. Every time the user is in the coverage area he will improve the knowledge of the coverage, thereby increasing and updating information of the hotspot location. Preferably, the information stored in the database 6 is also provided with a time stamp, so that old information may be sorted out when sharing information with other users, as will be described below.

The application 2 also cooperates with a local connectivity interface 5, typically using short range radio, such as with the common Bluetooth™ interface. The local connectivity is typically used by mobile terminals such as mobile phones and computers for connection to accessories and sharing information with other terminals in the immediate vicinity. A typical range is around 10-20 meters.

In order to gain information from other mobile terminals 9 and share its own information with other terminals 9, the mobile terminal 1 searches for other mobile terminals in the vicinity using the local connectivity interface 5. The application may broadcast information about available hotspots to other mobile terminals 9. A user of the mobile terminal 1 may also manually broadcast a request to mobile terminals 9 in the neighborhood.

The request could include a parameter defining the radius of interest, i.e. "known hotspots within 3 kilometer". The radius of interest may be defined by a user of the mobile terminal. The mobile terminal that receives the request could have a number of hotspots in that area that will be sent out as a response including approximate longitudes and latitudes for the known coverage area for each hotspot. Hotspots further away than the radius of interest will be excluded by the responding mobile terminal. For example, if a user is on $42^{nd}$ Street in New York City and this request is broadcast, the probability that there is someone in the proximity with detailed information about local hotspots is probably high, since the other user might work or live in the neighborhood and walk around in that area a lot, in other words, is continuously updating the coverage information for each hotspot in that area.

Similarly, the mobile terminal 1 awaits requests from other phones in the neighborhood and responds in the same way to any requesting other terminals 9.

When a mobile terminal receives information, it can compare the time stamps of the received information with that of the information contained in its own database. If the information is old, the user is prompted so he can choose not to use the information. One parameter in the application could be to "only show information not older than x months, days etc.

In a further embodiment, the mobile terminal may also share its database 6 with an external database 8, for instance a server associated with the provider of the access point 7. When the mobile terminal 1 is using the hotspot belonging to the access point 7 the provider may request information from the mobile terminal in order to gain further knowledge about its own coverage. The database 8 may also store information about other hotspots. This server could also be accessible through the Internet.

The invention results in a hotspot location database distributed over mobile terminals with automatic collection of information and automatic updates. A user that needs to find a hotspot can query other mobile terminals in the neighborhood about hotspots they know about and get an approximate location of these hotspots. The user does not have to access the Internet through the Internet browser. When the locations have been retrieved they may be fed into a navigation application so that the hotspots may be found easily on a map. The cellular phone could give directions how to get to the point of interest/coverage area.

The invention has been described with a certain degree of particularity, and it will be apparent to a person skilled in the art that certain modifications, variations and alternative constructions are possible. The scope of the invention is only limited by the claims below.

The invention claimed is:

1. A hotspot location database system comprising:
   a number of mobile terminals, each mobile terminal comprising:
      means for communication with a WLAN and detection of the received WLAN signal strength;
      means for detection of its position;
      means for storing information about WLAN access points at least including information about positions and coverage in a hotspot location database incorporated in the mobile terminal; and
   said mobile terminal being configured to:
      monitor the received WLAN signal strength associated with an access point;
      store location information about the coverage associated with said access point in said hotspot location database,
   wherein said system further comprising:
      means for communication with other mobile terminals using a local connectivity network; and
   said mobile terminal being configured to:
      monitor the presence of another mobile terminal within range for communication using the local connectivity network;
      send a request for hotspot location database update to the other mobile terminal; and
      receive a hotspot location database update from the other mobile terminal and to update its own hotspot location database.

2. A system according to claim 1, wherein said request contains a parameter defining the radius of interest for hotspots from the current location.

3. A system according to claim 2, wherein said radius of interest may be defined by a user of the mobile terminal.

4. A system according to claim 1, wherein said mobile terminal is adapted to:
   receive a request for hotspot location database update from another mobile terminal;
   send a hotspot location database update to the other mobile terminal.

5. A system according to claim 4, wherein said request contains a parameter defining the radius of interest for hotspots from the current location, and the mobile terminal is adapted to only include information from its hotspot location database associated to hotspots within the radius of interest from the current location.

6. A system according to claim 1, wherein the local connectivity network uses short range radio.

7. A system according to claim 1, wherein said mobile terminal is adapted to store said information in a hotspot location database in an external server.

8. A system according to claim 7, wherein the server is accessed through a WLAN access point.

9. A system according to claim 1, wherein location information comprises longitudes and latitudes of the coverage area of the current hotspot and a time stamp.

10. A mobile terminal for use in a hotspot location database system, said mobile terminal comprising:
- means for communication with a WLAN and detection of the received WLAN signal strength;
- means for detection of its position;
- means for storing information about WLAN access points at least including information about positions and coverage in a hotspot location database incorporated in the mobile terminal;

said mobile terminal being configured to:
- monitor the received WLAN signal strength associated with an access point;
- store location information about the coverage associated with said access point in said hotspot location database;

wherein in that said mobile terminal further comprising:
- means for communication with other mobile terminals using a local connectivity network;

said mobile terminal being configured to:
- monitor the presence of another mobile terminal within range for communication using local connectivity;
- send a request for hotspot location database update to the other mobile terminal; and
- receive a hotspot location database update from the other mobile terminal and to update its own hotspot location database.

11. A mobile terminal according to claim 10, wherein said request contains a parameter defining the radius of interest for hotspots from the current location.

12. A mobile terminal according to claim 11, wherein said radius of interest may be defined by a user of the mobile terminal.

13. A mobile terminal according to claim 10, wherein said mobile terminal is adapted to:
- receive a request for hotspot location database update from another mobile terminal;
- send a hotspot location database update to the other mobile terminal.

14. A mobile terminal according to claim 13, wherein said request contains a parameter defining the radius of interest for hotspots from the current location, and the mobile terminal is adapted to only include information from its hotspot location database associated to hotspots within the radius of interest from the current location.

15. A mobile terminal according to claim 10, wherein the local connectivity network uses short range radio.

16. A mobile terminal according to claim 10, wherein said mobile terminal is adapted to store said information in a hotspot location database in an external server.

17. A mobile terminal according to claim 16, wherein the server is accessed through a WLAN access point.

18. A mobile terminal according to claim 10, wherein the location information comprises longitudes and latitudes of the coverage area of the current hotspot and a time stamp.

19. A method for maintaining and updating a hotspot location database system comprising the steps of:
- monitoring received WLAN signal strength associated with an access point with at least one mobile terminal;
- storing location information about the coverage associated with said access point in a hotspot location database incorporated in the mobile terminal;
- in one mobile terminal, monitoring the presence of another mobile terminal within range for communication using local connectivity;
- said one mobile terminal sending a request for hotspot location database update to the other mobile terminal; and
- said one mobile terminal receiving a hotspot location database update from the other mobile terminal and updating the hotspot location database of the sending mobile terminal.

20. A method according to claim 19, wherein said request contains a parameter defining the radius of interest for hotspots from the current location.

21. A method according to claim 20, wherein said radius of interest is defined by a user of the sending mobile terminal.

22. A method according to claim 19, wherein the method includes the further steps of:
- in one mobile terminal receiving a request for hotspot location database update from another mobile terminal;
- said one mobile terminal sending a hotspot location database update to the other mobile terminal.

23. A method according to claim 22, wherein said request contains a parameter defining the radius of interest for hotspots from the current location, and said one mobile terminal only including information from its hotspot location database associated to hotspots within the radius of interest from the current location.

24. A method according to claim 19, wherein the local connectivity network uses short range radio.

25. A method according to claim 19, wherein said information is stored in a hotspot location database in an external server.

26. A method according to claim 25, wherein the server is accessed through a WLAN access point.

27. A method according to claim 19, wherein the location information comprises longitudes and latitudes of the coverage area of the current hotspot and a time stamp.

* * * * *